United States Patent [19]
Twibell et al.

[11] 4,388,687
[45] Jun. 14, 1983

[54] MEMORY UNIT

[75] Inventors: Jerome J. Twibell; Robert J. Johnston, both of Phoenix, Ariz.

[73] Assignee: Honeywell Information Systems Inc., Phoenix, Ariz.

[21] Appl. No.: 222,462

[22] Filed: Jan. 5, 1981

[51] Int. Cl.³ .............................................. G06F 9/06
[52] U.S. Cl. .................................................. 364/200
[58] Field of Search ... 364/200 MS File, 900 MS File

[56] References Cited

U.S. PATENT DOCUMENTS

| 4,047,245 | 9/1977 | Knipper | 364/200 |
| 4,085,442 | 4/1978 | Liaukus et al. | 364/900 |

Primary Examiner—Thomas M. Heckler
Attorney, Agent, or Firm—Arthur A. Sapelli; William W. Holloway, Jr.; L. J. Marhoefer

[57] ABSTRACT

A memory unit having a multiplicity of storage locations for the temporary storage of series of groups of data signals. When the data groups are being stored in a memory location, index signals are developed that not only identify the location of the stored signal group, but when applied to the memory unit cause the data group to be withdrawn from the memory unit. The memory unit is comprised of a first addressable multiplicity of storage locations; a second addressable multiplicity of storage locations, the contents of the second multiplicity of storage locations adapted for addressing the first multiplicity of storage locations, a counter for addressing the second multiplicity of storage locations; and control logic for controlling the counter and entry and withdrawal of data signals in the first and second multiplicity of storage locations. The second multiplicity of storage locations contain the index signals that are also the addresses of the related data signal groups in the first multiplicity of storage locations. As data signal groups are withdrawn from a first storage location in response to application of index signals, a second storage location stores the address (i.e., the index signal of the first storage location not available for storage of a data signal group). The storage of a data signal group with the concurrent development of index signals, or the withdrawal of the data signal groups can be accomplished in one clock cycle. In addition, a simultaneous storage and withdrawal of data signal groups can be accomplished in one system clock cycle.

12 Claims, 6 Drawing Figures

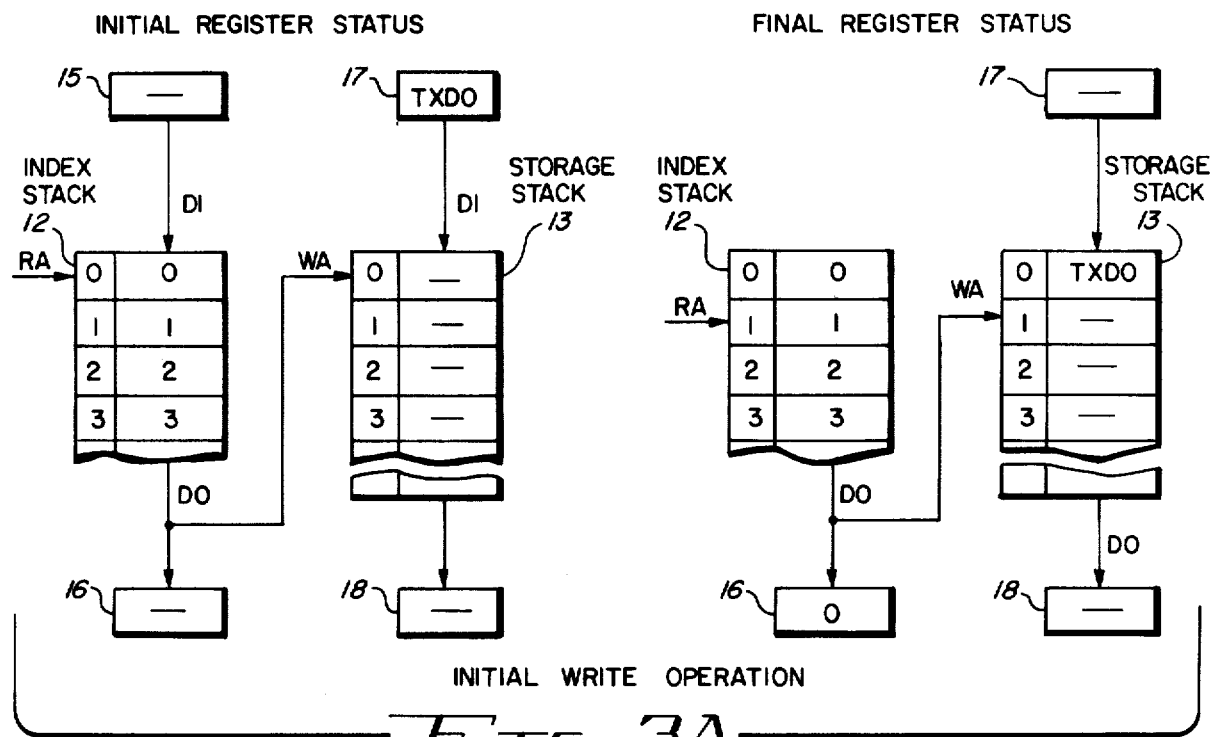
*Fig-3A* — INITIAL WRITE OPERATION
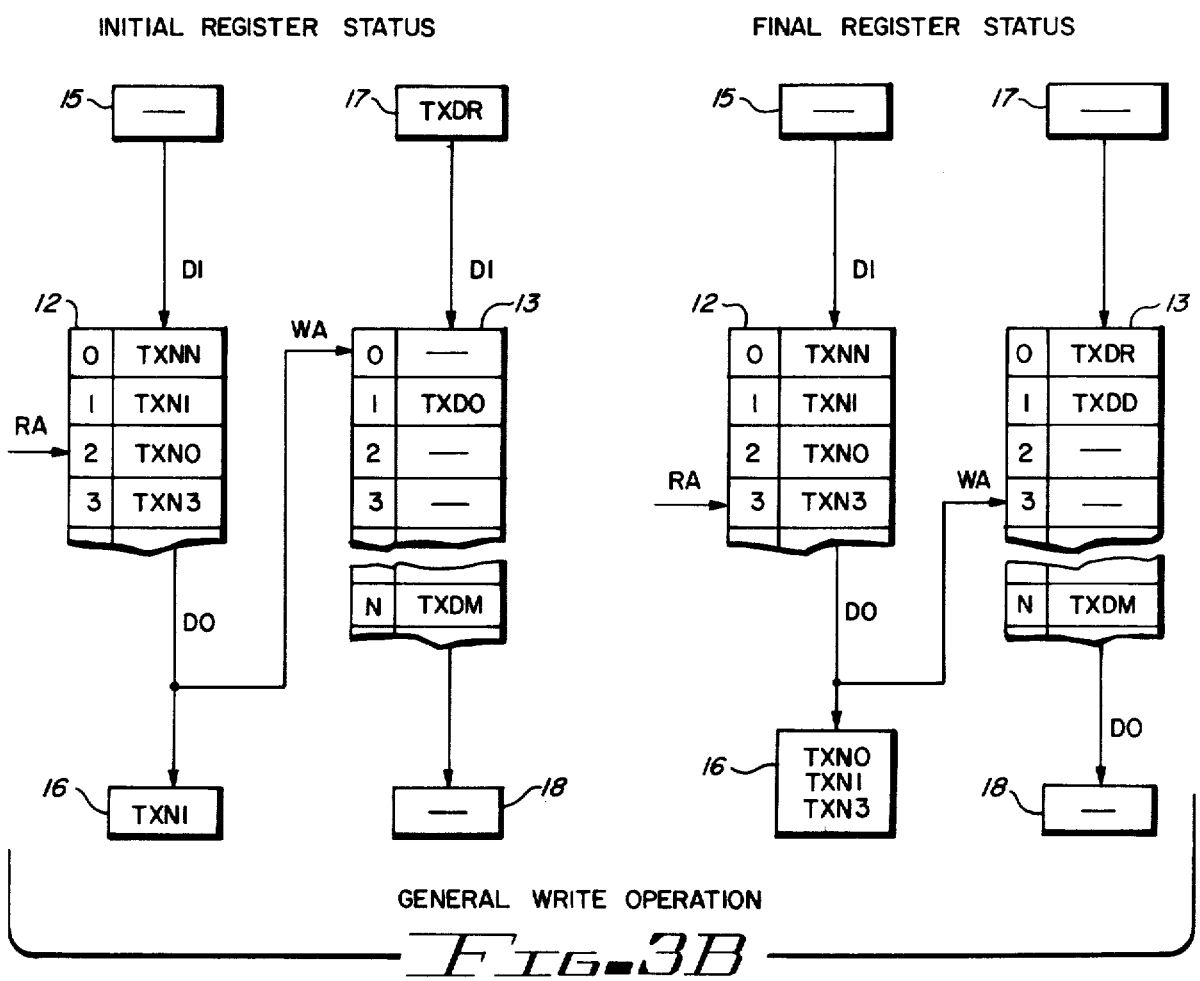
*Fig-3B* — GENERAL WRITE OPERATION

GENERAL READ OPERATION

GENERAL READ / WRITE OPERATION

MEMORY UNIT

BACKGROUND OF THE INVENTION

1. Field of the Invention

This invention relates generally to data processing systems and more particularly to means for temporary storage of groups of data signals. In modern data processing systems, in order to reduce the number of data paths associated with movement of data, it is frequently desirable to store, temporarily, a portion of a data signal group and replace the stored portion with an abbreviated data group during manipulation, in the data processing unit, for which the temporarily stored data group is irrelevant. As an example, a group of data signals, stored in a peripheral subsystem, and which are to be manipulated by the central processing unit can have a true address. With the present apparatus, the true address can be stored at the interface to the central subsystem, and an identifying data group can be transmitted with the data signal group during manipulation in the central processing unit. Upon return from the central processing unit to the interface, the identifying number can be utilized to provide the true address for restorage of the data group in the peripheral subsystem.

2. Description of the Prior Art

A variety of devices for the temporary storage of groups of data signals is known in the prior art. Cache memory devices provide a good example. The function of the devices is to provide a temporary storage of data signal groups for generally random or non-sequential withdrawal at some later time. Many of the strategies for providing identifying numbers for accessing the stored data groups include associating a particular physical location with a portion of the address. It can, moreover, require an excessive amount of apparatus to store, identify and retrieve data signal groups and subsequently, to store data groups in memory locations of changing availability.

It is therefore an object of the present invention to provide apparatus for improved performance of a data processing system.

It is a further object of the present invention to provide an improved memory unit for temporary storage of data signal groups for use in a data processing unit.

It is a still further object of the present invention to provide a memory unit for temporary storage of groups of data signals which can be entered into and removed from the memory unit in random order.

It is a more particular object of the present invention to provide a memory unit for storage of groups of data signals in a multiplicity of memory locations and for developing signals identifying the memory location, the entire procedure occurring in a single clock cycle.

It is another more particular object of the present invention to provide a memory unit for temporary storage of groups of data signals for which identifying signals applied to the memory unit can cause the removal of a predetermined data signal group in a single clock cycle.

It is a still more particular object of the present invention to provide a first group of memory locations which can be addressed by the contents of a second group of memory locations, the contents of the second group of memory locations providing either a location in the first memory location group available for storage of a group of data signals or data signals identifying the location of a stored data signal group.

SUMMARY OF THE INVENTION

The aforementioned and other objects of the present invention are accomplished by providing a first group of memory locations, a second group of memory locations for addressing the first group of memory locations, a counter unit for addressing the second group of memory locations, and control logic, controlling the operation of the counter and the first and second memory location groups. Initially, the second group of memory locations contains logic signals, each location uniquely addressing a location in the first memory location group. As data signal groups are entered in the first group locations, the location is determined by the address signals in locations in the second address group addressed by the counter. Concurrent with the storage of data signal groups, the address signals from the second group location are forwarded to other parts of the data processing systems as index signals identifying associated stored data groups. During the extraction of the data signals, the index signals are used to address the associated location in the first memory group. Concurrently, the index signals identifying locations from which data signal groups are withdrawn are stored in second group locations indicating the availability of the addressed first group location and permitting a new group of data signals to be entered in the available first location group. The memory unit is adapted so that a store (write) operation, withdrawal (read) operation or simultaneous store/withdrawal operation can occur during one timing cycle. Apparatus is included to provide a signal indicating that all of the available first group memory locations contain data signal groups and are, at least pending removal of data signal groups from a first location group, unavailable for a storage of additional data signal groups.

These and other features of the invention will be understood upon reading of the following description along with the drawings.

BRIEF DESCRIPTION OF THE DRAWINGS

FIGS. 3A, 3B, 3C, and 3D illustrate schematically the manipulation of data for each of the operations of the indexed memory unit.

DESCRIPTION OF THE PREFERRED EMBODIMENT

Detailed Description of the Figures

Figure 1:
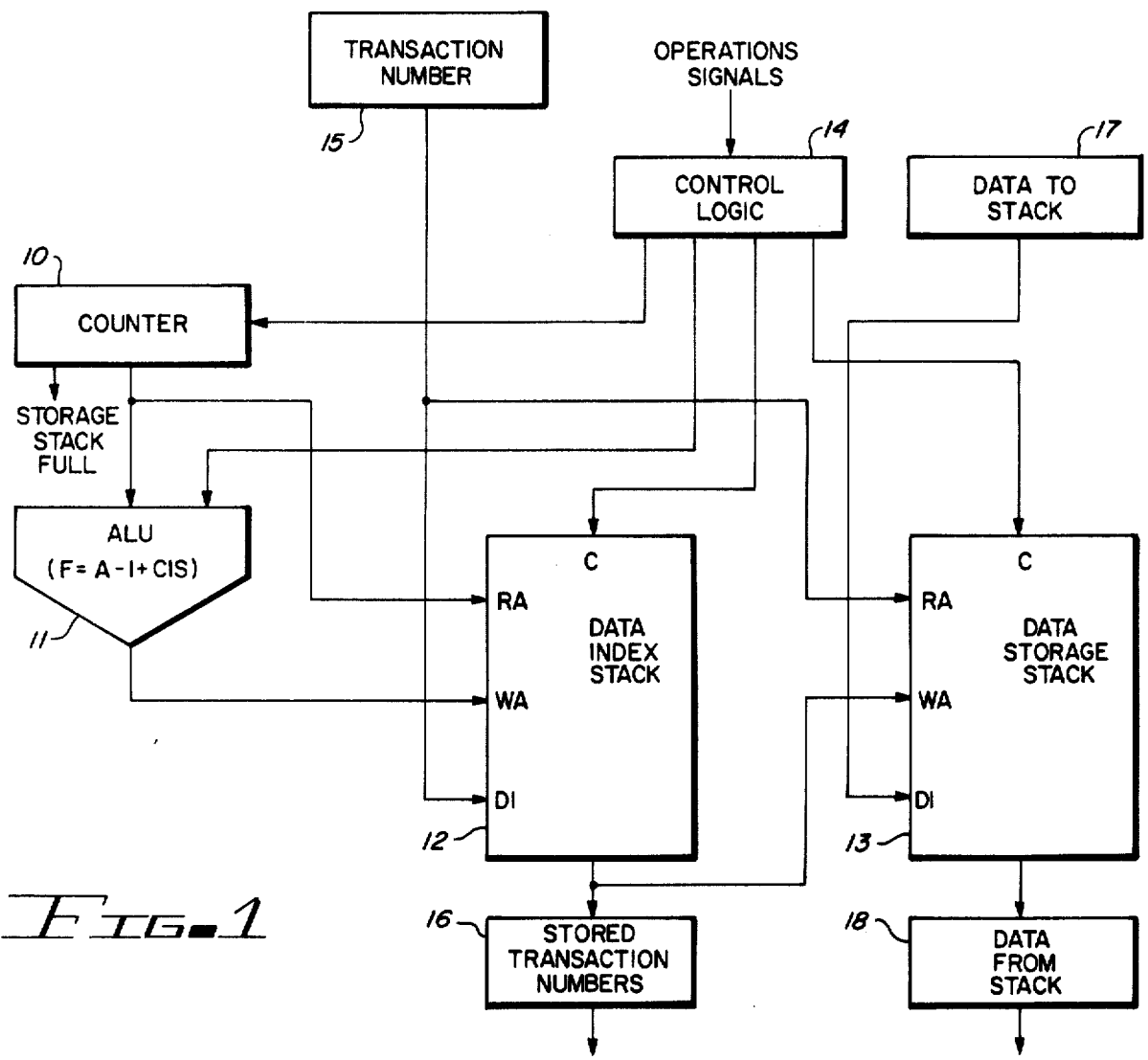
FIG. 1 is a schematic block diagram of the logic elements comprising the memory unit.

Referring first to FIG. 1, a schematic block diagram of the indexed memory units is shown. Control logic 14 receives operation control signals from other portions of a data processing system. The control logic 14 is coupled to counter 10, arithmetic logic unit 11, data index memory location group (stack) 12, and data memory location group (stack) 13. The counter 10 is coupled to ALU 11, and data index stack 12. The data index stack 12 is coupled to an input transaction number apparatus 15 and output transaction number apparatus 16 and is coupled to data storage stack 13. Data storage stack 13 is coupled to the data-to-stack register 17 and the data-from-stack apparatus 18. The memory stacks are comprised of a multiplicity of signal group storage locations.

Figure 2:
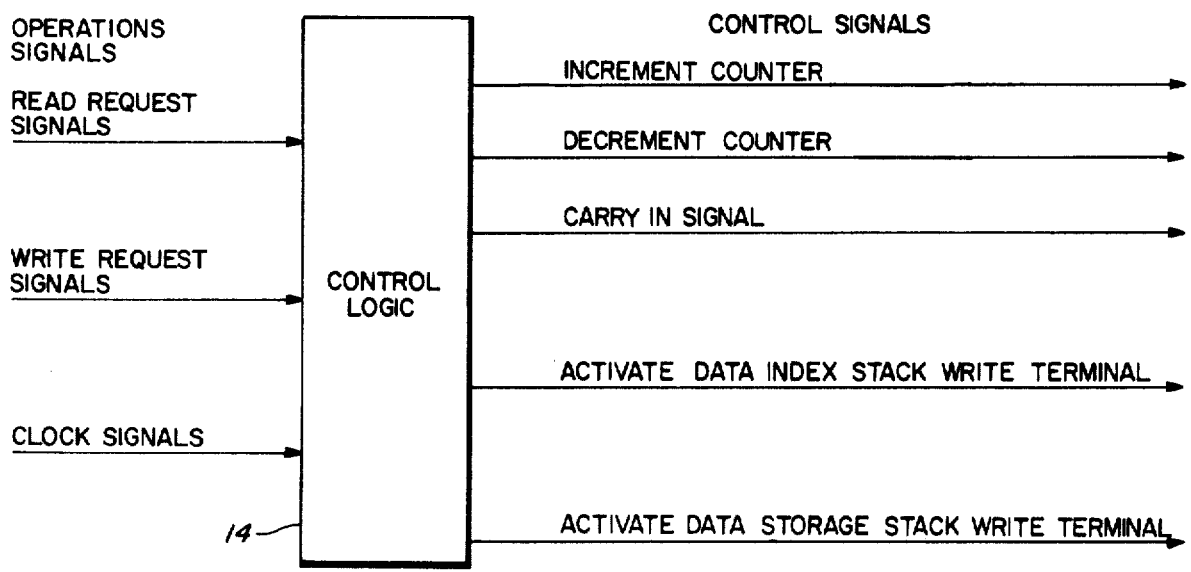
FIG. 2 illustrates the control signals received and the control signals generated by the control logic.

Referring next to FIG. 2, the signals applied to control logic 14 from the data processing system and the signals generated by control logic 14 to the memory unit are shown. Signals applied to the control logic 14 include a request for the write (storage) of data signal groups, a request for a read (withdrawal) of data signal groups and data processing unit clock signals. In response to those signals, counter incrementing and decrementing signals, a carry-in signal, and signals implementing read and write procedures in the index stack and in the data storage stack are generated.

Figure 3C:
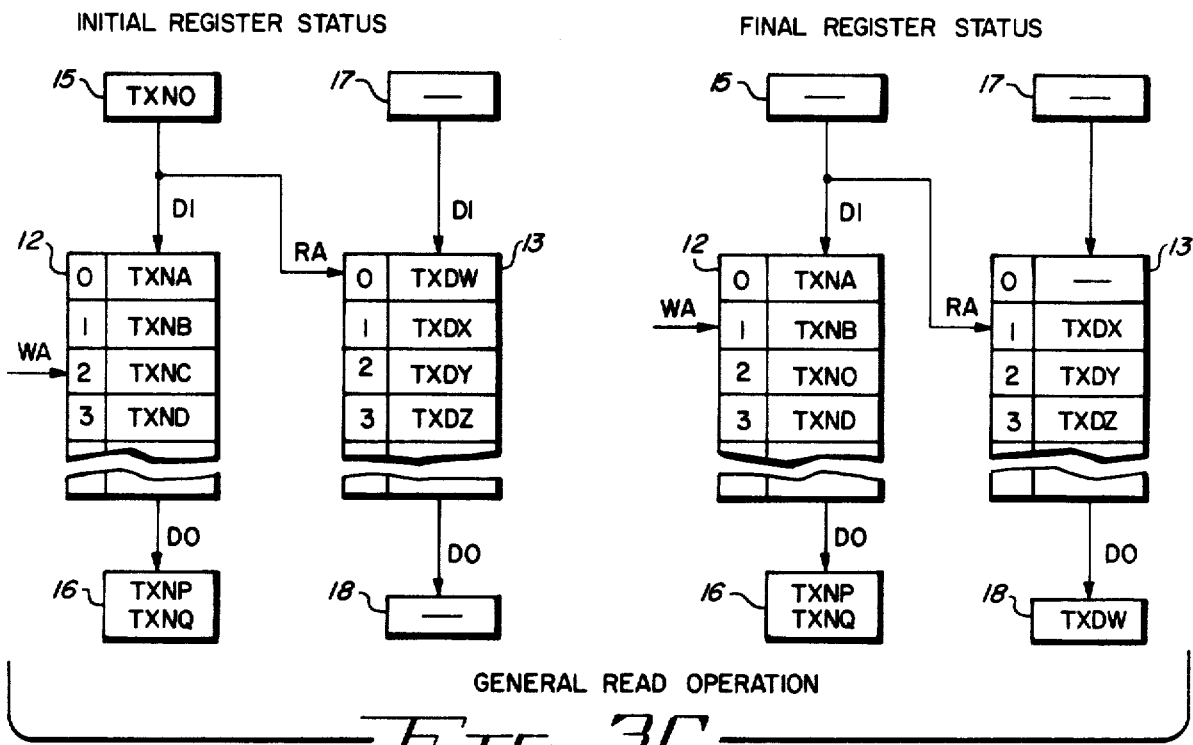
Figure 3D:
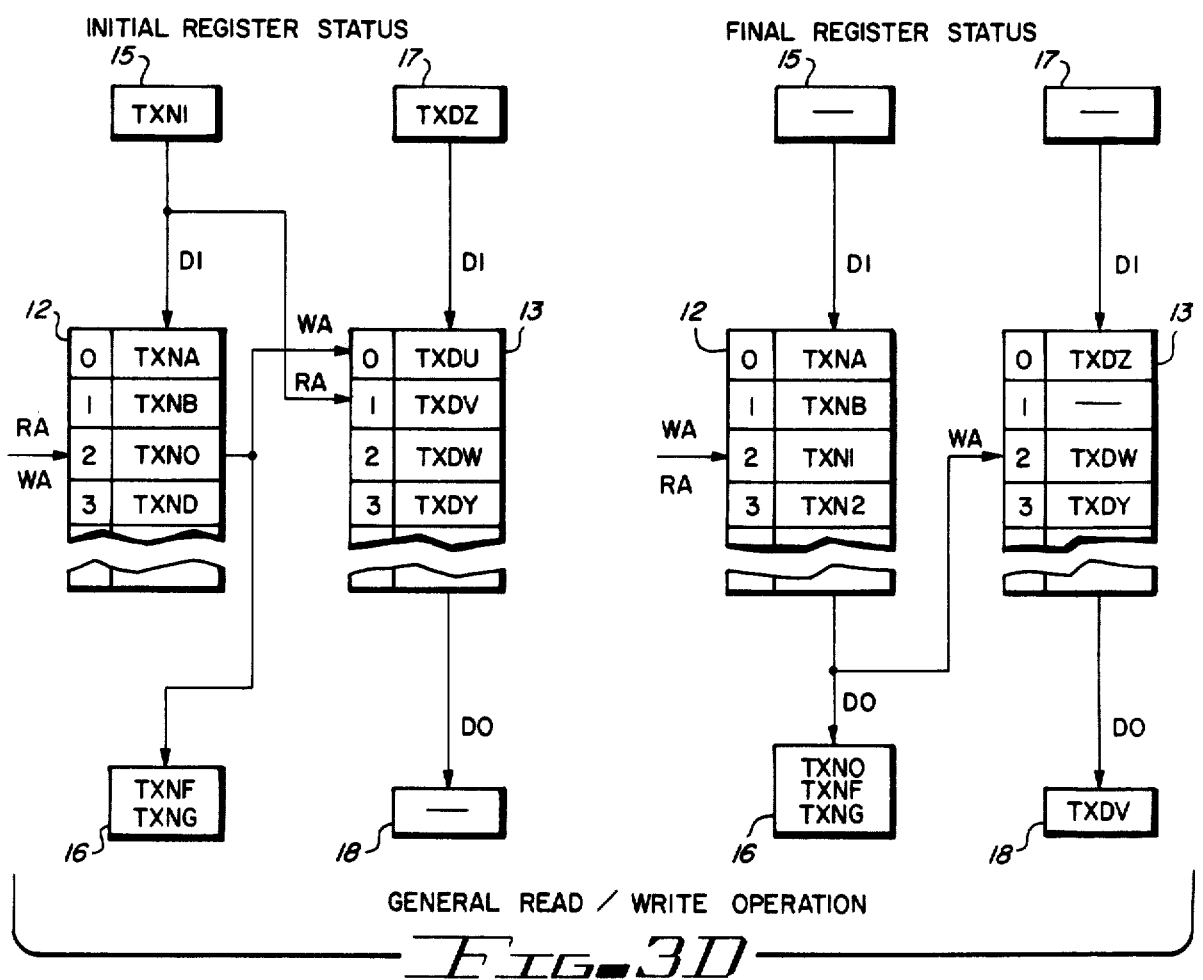

Referring next to FIG. 3, the schematic procedure demonstrating the write, the read, and the simultaneous read/write operations in the memory unit are shown. FIG. 3A illustrates the initial write operation, FIG. 3B illustrates a general write operation, FIG. 3C illustrates a general read operation and FIG. 3D illustrates a simultaneous read/write operation.

Operation of the Preferred Embodiment

Referring again to FIG. 1, index stack 12 and storage stack 13 are implemented by groups of registers and associated apparatus having the following characteristics: address signals applied to input terminal WA in conjunction with an appropriate control signal applied to input terminal C will cause data signals applied to data input terminal DI to be stored in the register. Address signals applied to the terminal RA will cause the contents of the register location identified by the address signals to be applied to the data output terminal DO. With this mode of operation for the index memory stack 12 and the storage memory stack 13, the operation of the invention can be understood as follows.

Initially each location of the index stack contains a (unique) address for a location in the data storage stack. The data storage stack need not contain useful information data initially and can be set to any value. The writing of data into the data storage stack 13 provides a related transaction number (i.e., index signals) via apparatus 16 to the data processing system. The transaction number can be used to retrieve the related data signals. The data to be stored in storage stack 13 is applied via apparatus 17 to the data input terminal DI of stack 13. Simultaneously, the appropriate operation signals, indicating that the write operation is to be performed, are applied to control logic 14. Referring to FIG. 3A to illustrate the initial write operation, the index stack 12 is addressed in the read operation (RA) terminal in the first sequential location by counter 10. The read address location signals (i.e., location 0) are applied to the data output terminal of stack 12. These signals are applied to apparatus 16 which transmits the index or transaction number to the data processing unit and to the write address (WA) terminals of stack 13. The control logic 14 applied appropriate signals to stack 13 so that signals applied to the data in DI terminal of stack 13 are stored at the address specified by the data out signal (i.e., location 0) of stack 12. At the end of the processing system clock period, the counter 10 will automatically be incremented, causing the next address to be applied to read address of stack 12.

Similarly, a general write operation following a series of operations in storage stack 13 and causing a related transaction number to be entered in apparatus 16 have been executed is illustrated in FIG. 3B. The transaction number TXNO is applied to the data processing system. The addressed location (0) stores the applied data signal group TXDR in response to signals applied to the WA terminal by stack 12.

When the number of data groups to be stored exceeds the addressing capability of the index stack 12, counter 10 is adapted to produce a memory full signal, prohibiting acceptance of additional requests for storage of information until space in the index stack is available.

Turning now to the operation for reading data from storage stack 13 a transaction number in apparatus 15 is applied to read address terminal of stack 13 in order that the data signals stored in the location determined by the transaction number is applied to the data output DO terminal of stack 13 and consequently to apparatus 18 for storing or manipulation of the data signals. Concurrently, the transaction number is applied to the data in DI terminal of index stack 12. The control logic, in response to the identification of a read operation activates the ALU circuit 11, which in turn activates the write address of data index stack 12 at a location one sequential position behind counter 10, i.e., F (the output address = A (the counter 10 output signal address − 1). Thus, the transaction number will be written in that address defined by ALU 11. At the end of the data processing system clock cycle, counter 10 will be decremented in response to the implementation of a read operation so that the next write operation will be stored in the location from which data has now been removed and applied to apparatus 18.

It will be clear that the signals stored in the index stack serve as an indication of available storage location during or prior to the index stack location being addressed by the counter 10. After being addressed by counter 10, the contents of the stack location can be of no further significance. It will be clear that it is possible to have the same contents in several index stack locations. It will be seen that the count of counter 10 at the beginning of a clock cycle will in general be one more than the number of index numbers identifying storage stack locations with required data signal groups.

Referring to FIG. 1 and FIG. 3D, it is possible to perform a read operation and a write operation simultaneously. Control logic 14, in response to the concurrent application of both read and write signals, produces a carry-in signal which increments ALU 11 so that both ALU 11 and counter 10 apply the same address to both the index stack write terminal and read index stack terminal. In order to maintain the correct number of stored data signal groups, counter 10 will not be decremented or incremented at the end of a cycle when read and write operation signals are applied simultaneously. The control signals from control logic 14 activate the read terminals for both the storage memory stack. Thus, the applied transaction number is entered (via the write operation) in the addressed location in the index stack. Because the read terminal is also activated, the previously stored index number is applied to the write terminal of the storage stack and to the index number apparatus 16. The write terminal of the storage stack is also activated by control logic 14. The data signal group in the data-to-stack apparatus 17 is entered in the address applied to the storage stack by the index stack, while the transaction number apparatus 15 applies the address to the storage stack 13, causing the contents of that location to be applied to data-from-stack apparatus 18. At the end of the operation, counter 10 is not incremented but will be incremented during the next timing cycle unless a concurrent read/write operation is to be performed.

Referring now to FIG. 2, the various control signals produced by control logic 14 are shown. The write request at the end of one data processing system clock cycle produces a signal incrementing counter 10 a single count. Similarly, a read request decrements the counter a single count at the end of the data processing system clock cycle. The presence of a pending read and write operation request simultaneously causes the counter 10 not to increment after a write operation and applies a carry-in-signal to ALU 11 for the duration of the timing cycle. The presence of a write operation request for control logic 14 causes the read address of index stack 12 and the write address of storage stack 13 to be activated. The presence of a read operation request causes the write address of index stack 12 and the read address of the storage stack 13 to be activated. The application of simultaneous read and write signals to control logic 14 produces signals causing the write address terminal and the read address to be activated for both index stack 12 and storage stack 13. In the preferred embodiment, the contents of the location addressed by the read signals are always applied to apparatus 16 and 18. Whether these data signal groups are actually entered into the data processing system is determined by the operation being performed.

It will be clear that the present arrangement permits the read operation, the write operation, or the simultaneous read and write operation to be completed in a single timing cycle of the data processing unit. This feature is especially important in the modern high performance data processing system, wherein each additional cycle impacts the operating characteristics of the system.

The above description is intended to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In association with a data processing system, a memory unit for temporary storage of data signal groups comprising:
    a first group of storage locations for storing said data signal groups,
    a second group of storage locations coupled to said first group of storage locations, each storage location of said second group of storage locations storing an address value corresponding to a storage location of said first group of storage locations;
    counter means for addressing said second group of storage locations; and
    control apparatus generating control signal sets for said memory unit in response to signals from said data processing system, wherein a first control signal set causes a first data signal group from said data processing system to be entered in a first storage location of said first group of storage locations, said first storage location being identified by a first address value stored in a first location of said second group of storage locations, said first location of said second group of storage locations being identified by a first counter value contained in said counter means, said first address value stored in said first location of said second group of storage locations being coupled to said data processing system, and wherein a second control signal set causes a second data signal group stored in a second location of said first group of storage locations to be coupled to said data processing system by a second address value coupled by said data processing system to said first group of storage locations, said second address value coupled by said data processing system being stored concurrently in a second location of said second group of storage locations, said second location being determined by a second counter value of said counter means.

2. The memory unit of claim 1 wherein each storage location of said second group of storage locations initially contains a unique first address value of said first group of storage locations.

3. The memory unit of claim 1 wherein said first and said second control signal set can be generated concurrently by said control means.

4. The memory unit of claim 3 wherein said counter means can increment one count after a first control signal set when a first and second control signal set is not applied during a timing interval, and decrements one count after a second control signal set is applied.

5. A memory unit responsive to control signals, data signal groups and index signal groups for temporary storage of said data signal groups comprising:
    a control means responsive to said control signals for generating a first set of control signals and a second set of control signals;
    a first means and a second means for storing of said data signal groups and said index signal groups, respectively, said first means and said second means coupled to said control means; said first and said second means each having an input terminal activated by a write control signal for storage of data at a location determined by signals applied to a write address terminal; wherein an output terminal of said second means is coupled to the write address terminal of said first means, data signal groups being applied to said input terminal of said first means and index signal groups being applied to the input terminal of said second means and to a read address terminal of said first means, wherein said first set of control signals includes a write control signal applied to said second means; wherein said second set of control signals includes a write control signal applied to said first means; and
    counter means coupled to a read address terminal and to the write address terminal of said second means for applying read and write address signals, respectively, to said second means.

6. The memory unit of claim 5 wherein each location of said second means initially contains a unique first address value of said first means.

7. The memory unit of claim 5 wherein said control means is also coupled to said counter means, said control means incrementing said counter means one count at the end of said second set of control signals when the first and second set of control signals are not simultaneously pending, said control means decrementing said counter means one count at the end of said first set of control signals.

8. The memory unit of claim 5 wherein said counter means generates a storage stack full signal when all locations of said first means are utilized for storage of said data signal groups.

9. The memory unit of claim 5 wherein said first set and said second set of control signals are applied concurrently and wherein said control means applies a first control signal to said counter means causing the read address terminal and the write address terminal of said second means to each receive an address signal having the same value.

10. The memory unit of claim 9 wherein said counter means contains a counter, said counter coupled to the read address terminal of said second means, said counter means including an arithmetic unit coupled to the write address terminal of said second means, said arithmetic unit containing a value of one count less than said counter unless the first set and second set of control signals are simultaneously generated by said control means in response to said control signals applied to said memory unit.

11. In a data processing system, having a unit for supplying operation signals to a control logic, and further having a memory unit for temporary storage of units of data, and said control logic generating a first, second, third, fourth, and fifth control signal in response to said operation signals, said memory unit comprising:
 a. first stack means for storing said units of data, said first stack means having a predetermined number of addressable locations wherein each addressable location has the capacity to store a single unit of data, and further having a control terminal adapted to receive said first control signal, and also having an input terminal adapted to receive said unit of data from said data processing system, and also having an output terminal adapted to transmit said unit of data to said data processing system, and also having a write address terminal adapted to receive a write address signal having a value corresponding to a location address of said first stack means which in conjunction with said first control signal causes said unit of data coupled to said input terminal to be written into the addressable location of said first stack means specified by the write address signal, and also having a read address terminal adapted to receive a read address signal from said data processing system, the read address signal having a value corresponding to an address location, which in conjunction with said first control signal causes the unit of data stored in said first stack means to be read from the addressable location specified by the read address signal and to be coupled to said output terminal;
 b. second stack means for storing address data, said second stack means having the same number of addressable locations as the predetermined number of addressable locations of said first stack means wherein each addressable location of said second stack means stores address data having a value corresponding to a location address of said first stack means into which said unit of data is to be written, each addressable location of said second stack means initially containing address data having a unique location address value of said first stack means, and further having a control terminal adapted to receive said second control signal, and also having an output terminal adapted to transmit said address data, having an input terminal adapted to receive the read address signal from said data processing system, and also having a write address terminal adapted to receive a second write address signal which in conjunction with said second control signal causes the read address signal coupled to said input terminals to be written into the address location specified by the second write address signal, and having a read address terminal adapted to receive a second read address signal which in conjunction with said second control signal causes the address data stored in said second stack means to be read from the address location specified by the second read address signal and coupled to said output terminal, the output terminal of said second stack means coupled to the write address terminal of said first stack means and to said data processing system; and
 c. counter means for supplying said second read address signal and said second write address signal to said second stack means, having a first, second, and third input terminals adapted to receive said third, fourth and fifth control signal, and having a first and second output terminal wherein said first output terminal is adapted to transmit said second read address signal having a second address value and wherein said second output terminal is adapted to transmit said second write address signal having a third address value, said first output terminal of said counter means coupled to the read address terminal of said second stack means and said second output terminal of said counter means coupled to said write address terminal of said second stack means, said counter means incrementing the second and third address values of said second read address signal and said second write address signal respectively, in response to said third control signal, decrementing the second and third address values of said second read address signal and said second write address signal, respectively, in response to said fourth control signal, and incrementing the third address value of said second write adddress signal in response to said fifth control signal.

12. A method of temporarily storing data signal groups in a memory unit of a data processing unit comprising the steps of;
 a. in locations of a second storage means, initially storing unique address values of locations of a first storage means, wherein addressing a first location of said second storage means addresses the location of said first storage means stored in said first location of said second storage means;
 b. for a write operation, sequentially addressing said second storage means for obtaining an address value of said first storage means for storage of said data signal group in a location indicated by the address value;
 c. applying the address value of said first storage means to said data processing unit for identifying said data signal group location;
 d. for a read operation in which an identifying address for a related data signal group is applied to said memory unit from said data processing unit, addressing the second storage means location most recently used to store information as pointed to by a value stored in an arithmetic unit, and addressing a first storage means location identified by said identifying address, said addressing of said first storage means location causing said related data signal group to be applied to said data processing unit; and
 e. storing said identifying address in said addressed second storage means locations, said identifying address now identifying an available first storage means location.

* * * * *